(12) United States Patent
Wada (10) Patent No.: US 7,292,783 B2
(45) Date of Patent: Nov. 6, 2007

(54) LENS DRIVE MECHANISM AND IMAGE-TAKING APPARATUS

(75) Inventor: Hiroyuki Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 10/925,301

(22) Filed: Aug. 24, 2004

(65) Prior Publication Data

US 2005/0047774 A1   Mar. 3, 2005

(30) Foreign Application Priority Data

Aug. 29, 2003   (JP)   ............... 2003-307381

(51) Int. Cl.
  *G03B 13/10*   (2006.01)
  *G02B 15/14*   (2006.01)
(52) U.S. Cl. .............. 396/72; 396/379; 348/341; 359/699
(58) Field of Classification Search ............... 396/379, 396/72, 79, 85; 348/341; 359/694, 699–701
See application file for complete search history.

(56) References Cited

U.S. PATENT DOCUMENTS 6,408,139 B1 * 6/2002 Yamane et al. ............ 396/379
6,498,903 B2 * 12/2002 Omiya ..................... 396/379
6,522,840 B2 * 2/2003 Kano et al. ................ 396/379

FOREIGN PATENT DOCUMENTS

JP   2000-075187   3/2000
JP   2001-242507   9/2001

\* cited by examiner

*Primary Examiner*—W. B. Perkey
*Assistant Examiner*—Rishi S. Suthar
(74) *Attorney, Agent, or Firm*—Cowan, Liebowitz & Latman, P.C.

(57) ABSTRACT

A lens drive mechanism, enabled to move lens holding member in a stable state, is disclosed. The lens drive mechanism comprises: first and second guide members, each extending in a predetermined direction; a first lens holding member holding a first lens and including a first cam follower portion and a first sleeve portion which engages with the first guide member and is guided in the predetermined direction; a second lens holding member holding a second lens and including a second cam follower portion and a second sleeve portion, which engages with the second guide member and is guided in the predetermined direction; and a cam member engaging with the first and second cam follower portions and driving the first and second lens holding members.

5 Claims, 5 Drawing Sheets

LENS DRIVE MECHANISM AND IMAGE-TAKING APPARATUS

BACKGROUND OF THE INVENTION

1. Field of the Invention

This invention relates to a lens drive mechanism used in an image-taking optical system or a viewfinder optical system of an image-taking apparatus.

2. Description of the Related Art

A viewfinder optical system of an image-taking apparatus is disposed so that an optical axis of the viewfinder optical system will be substantially parallel to an optical axis of an image-taking optical system. In the driving of lens elements in the viewfinder optical system in the optical axis direction, cam follower portions, which are provided on lens holding members that hold the lens elements in the viewfinder optical system, are made to contact cam groove portions of a cam ring provided in the image-taking optical system, and by converting the rotation of the cam ring to movement in the optical axis direction of the lens holding members in the viewfinder optical system, the field angle of the viewfinder optical system is changed according to a variation of the focal length of the image-taking optical system.

FIG. 4 shows diagrams of a viewfinder drive mechanism disclosed in Patent Document 1.

Figure 4A:
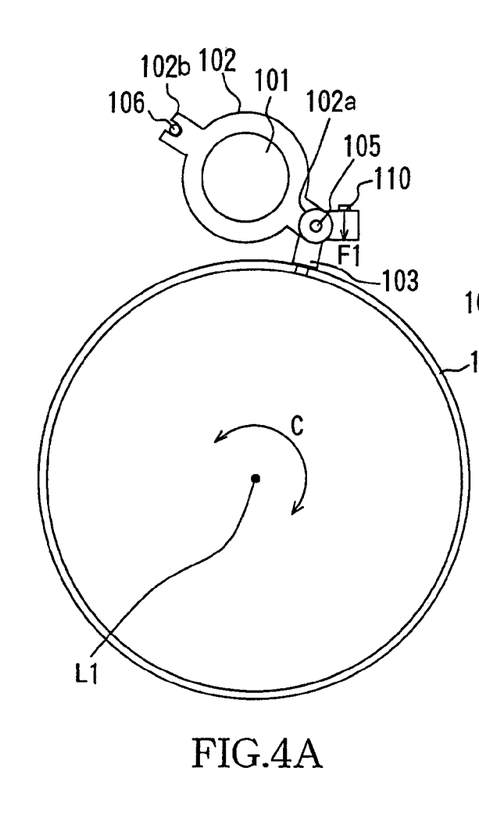
FIG. 4A is a front view of a conventional viewfinder drive mechanism.
Figure 4B:
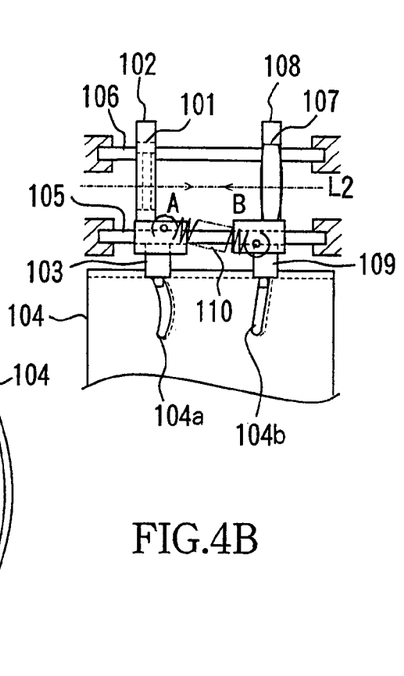
FIG. 4B is a side view of the viewfinder drive mechanism.
Figure 4C:
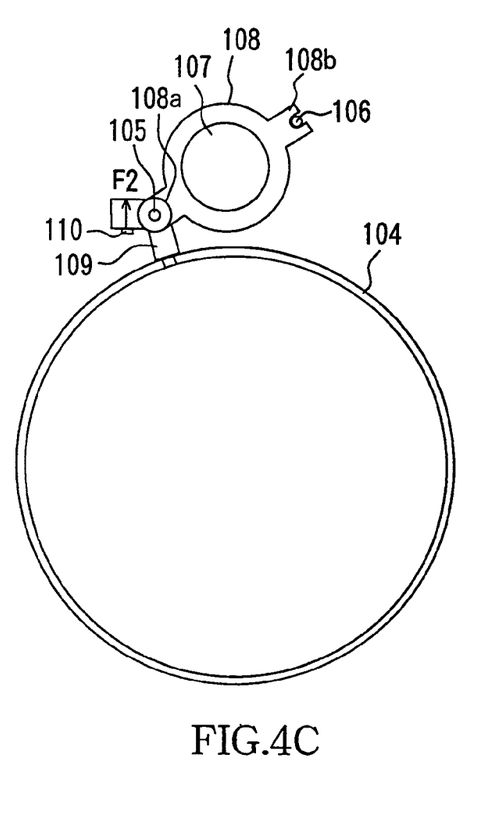
FIG. 4C is a rear view of the viewfinder drive mechanism.

FIG. 4A is a front view of the viewfinder drive mechanism, FIG. 4B is a side view of the viewfinder drive mechanism, and FIG. 4C is a rear view of the viewfinder drive mechanism.

In FIG. 4, Reference Numeral 101 denotes a first lens, Reference Numeral 102 denotes a first holding frame (lens holding member) that holds the first lens 101, and Reference Numeral 103 denotes a cam follower portion that is provided on the first holding frame 102.

Reference Numeral 107 denotes a second lens, Reference Numeral 108 denotes a second holding frame that holds the second lens 107, and Reference Numeral 109 denotes a cam follower portion that is provided on the second holding frame 108.

Reference Numeral 104 denotes a cam ring that rotates in the direction of the arrow C about an optical axis (image-taking optical axis) L1 of the image-taking optical system. Reference Numeral 104a denotes a first cam groove portion and Reference Numeral 104b denotes a second cam groove portion that are formed on the cam ring 104.

The cam follower portions 103 and 109 are engaged with the first cam groove portion 104a and the second cam groove portion 104b, respectively.

Reference Numeral 105 denotes a guide bar, which guides the holding frames 102 and 108 in the direction of an optical axis (viewfinder optical axis) L2, and Reference Numeral 106 denotes a rotation stopping bar, which prevents the rotation of the holding frames 102 and 108 about the guide bar 105.

On the first holding frame 102, a sleeve portion 102a, which engages with the guide bar 105 in a manner enabling movement in the optical axis L2 direction, and a U-shaped groove portion 102b, which engages with the guide bar 106 and blocks the rotation of the first holding frame 102, are formed.

Likewise, on the second holding frame 108, a sleeve portion 108a, which engages with the guide bar 105 in a manner enabling movement in the optical axis L2 direction, and a U-shaped groove portion 108b, which engages with the guide bar 106 and blocks the rotation of the second holding frame 108, are formed.

Reference Numeral 110 denotes an extension coil spring. The extension coil spring 110 is spanned across the first holding frame 102 and the second holding frame 108 in a state in which it forms a predetermined angle with respect to the guide bar 105.

The first holding frame 102 is thereby energized in the direction of the arrow A in FIG. 4B, the second holding frame 108 is energized in the direction of the arrow B in FIG. 4B, the cam follower 103 is pressed against a side wall of the cam groove portion 104a, and the cam follower 109 is pressed against a side wall of the cam groove portion 104b.

Also, since the extension coil spring 110 is positioned in a state in which it forms a predetermined angle with respect to the guide bar 105, component forces F1 and F2 (see FIG. 4A and FIG. 4C) are generated in directions substantially orthogonal to the optical axis L2 direction, and by these component forces, the sleeve portions 102a and 108a of the lens holding frames 102 and 108 are pressed against the guide bar 105 and eliminated of play. Vibrations of the lenses 101 and 107 during movement are thereby lessened to restrain vibrations of an image.

When in this state, the cam ring 104 rotates in the direction of the arrow C in the FIG. 4, the cam follower portions 103 and 109 are made, by the energizing force of the extension coil spring 110, to move without play along the cam groove portions 104a and 104b and the holding frames 102 and 108 moves in the optical axis L2 direction.

FIG. 5 shows diagrams of a viewfinder drive mechanism disclosed in Patent Document 2.

Figure 5A:
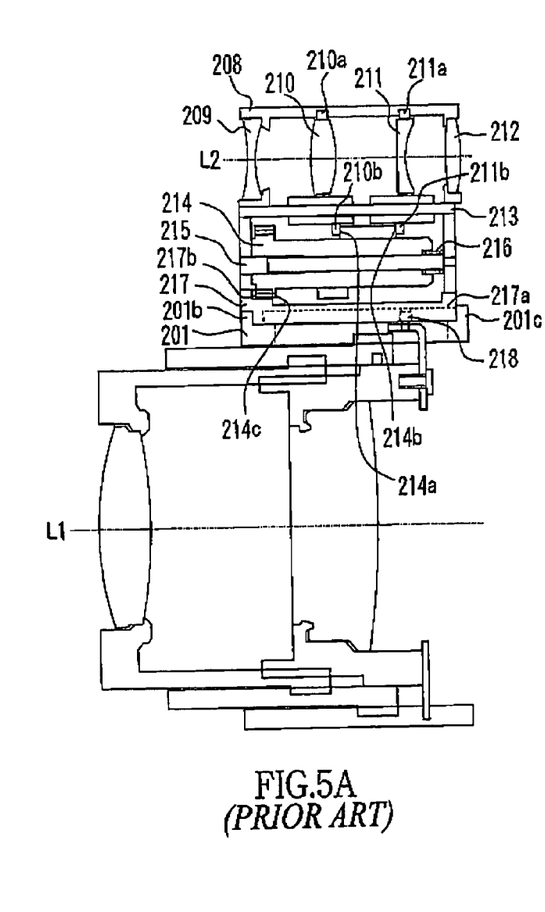
FIG. 5A is a sectional view showing a part of an image-taking apparatus having a conventional viewfinder drive mechanism and FIG. 5B is a rear view showing a part of the image-taking apparatus.
Figure 5B:
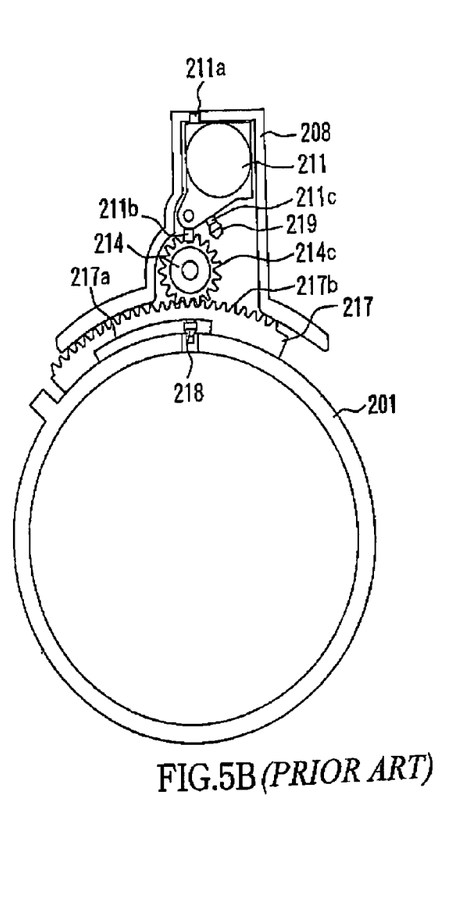

FIG. 5A is a sectional view resulting from sectioning the viewfinder drive mechanism along a plane containing an optical axis L2 of a viewfinder optical system, and FIG. 5B is a sectional view resulting from sectioning the viewfinder drive mechanism along a plane orthogonal to the optical axis L2.

A first movable lens unit 210 and a second movable lens unit 211 are lens units (each including lens and a lens holding member), which move when the zoom setting is changed in a variable zoom viewfinder optical system. Lenses 209 and 212 are fixed to a viewfinder block 208. Lens units 210 and 211 are engaged, in a manner enabling movement in the direction of the optical axis L2, to a rectilinear guide shaft 213, which is fixed to the viewfinder block 208.

The first movable lens unit 210 and the second movable lens unit 211 have rotation stopping bosses 210a and 211a, respectively. The rotation stopping bosses 210a and 211a engage with groove portions, which are formed on the viewfinder block 208 and extend in the optical axis L2 direction, to prevent the rotation of the lens units 210 and 211 about the axis of the rectilinear guide shaft 213.

The first movable lens unit 210 and the second movable lens unit 211 have cam follower bosses 210b and 211b as follower pins and respectively have spring latch bosses 211c (the spring latch boss of the first movable lens unit 210 is unillustrated). The cam follower bosses 210b and 211b are put in contact with cam groove portions 214a and 214b of a cylindrical cam 214 by the energizing force of a movable lens energizing spring 219 that is latched onto the spring latch bosses 211C formed on the lens units 210 and 211.

The cylindrical cam 214 is a part of a viewfinder zooming mechanism that rotates via a rotation shaft 215 and is held by the viewfinder block 208. The cylindrical cam 214 is set in the position in the optical axis L2 direction by receiving the energizing force of a cylindrical cam energizing spring 216.

The cylindrical cam 214 also has a second gear 214c as a follower gear, which engages with a first gear 217b, provided on an arcuate cam 217, and rotates by receiving the driving force from the arcuate cam 217.

Furthermore, the cylindrical cam 214 has, as viewfinder lens drive cams, cam groove portions 214a and 214b, which are provided in spiral form. By the rotation of cylindrical cam 214, the first movable lens unit 210 and second movable lens unit 211 are driven in the optical axis L2 direction via the cam follower bosses 210b and 211b that are in contact with the cam groove portions 214a and 214b.

The arcuate cam 217 is a principal portion of a coupling mechanism that couples the cylindrical cam 214, which is the part the viewfinder zooming mechanism of the variable zoom viewfinder optical system, according to the changing of the image-taking magnification of the image-taking lens barrel. The arcuate cam 217 is disposed to be movable within a predetermined range along an outer circumference of a fixed barrel 201 and is set in position in the optical axis L1 direction by flange portions 201b and 201c that are provided on the fixed barrel 201.

Also, the arcuate cam 217 has a cam groove portion 217a, a drive pin 218 serving as a drive portion is engaged with the cam groove portion 217a, and the cam groove portion 217a serving as a follower portion receives a driving force from the drive pin 218. The arcuate cam 217 is furthermore equipped with the first gear 217b serving as a drive gear portion that engages with the second gear 214c provided on the cylindrical cam 214. And when the image-taking lens barrel performs a zooming operation and the drive pin 218 moves in the optical axis L1 direction, the cam groove portion 217a is pushed and the arcuate cam 217 is thereby moved along the outer circumference of the fixed barrel 201. By this operation of the arcuate cam 217, driving force is transmitted to the cylindrical cam 214.

[Patent Document 1] Japanese Patent Application Laid-Open No. 2000-75187

[Patent Document 2] Japanese Patent Application Laid-Open No. 2001-242507

However, with each of the above-described conventional viewfinder drive mechanisms, since two lens units are engaged to a single guard bar, the length of a sleeve portion that is formed integral to each lens unit cannot be made adequately long. There is thus play, etc., between the lens units and the guide bar and the lens units cannot be moved in a stable manner in the optical axis direction.

SUMMARY OF THE INVENTION

One aspect of a lens drive mechanism according to this invention comprises: first and second guide members, each extending in a predetermined direction; a first lens holding member holding a first lens and including a first cam follower portion and a first sleeve portion, the first sleeve portion engaging with the first guide member and being guided in the predetermined direction; a second lens holding member holding a second lens and including a second cam follower portion and a second sleeve portion, the second sleeve portion engaging with the second guide member and being guided in the predetermined direction; and a cam member engaging with the first and second cam follower portions and driving the first and second lens holding members.

One aspect of an image-taking apparatus according to this invention comprises: the abovementioned lens drive mechanism; an image-taking lens unit; an image pickup element performing photoelectric conversion of an optical image formed by the image taking lens unit; and a drive member driving the image-taking lens unit and the cam member in the lens drive mechanism.

The characteristics of the lens drive mechanism and image-taking apparatus according to this invention shall be made clear by the following description of specific embodiments with reference to the drawings.

DETAILED DESCRIPTION OF THE PREFERRED EMBODIMENTS

Embodiment 1

Figure 1:
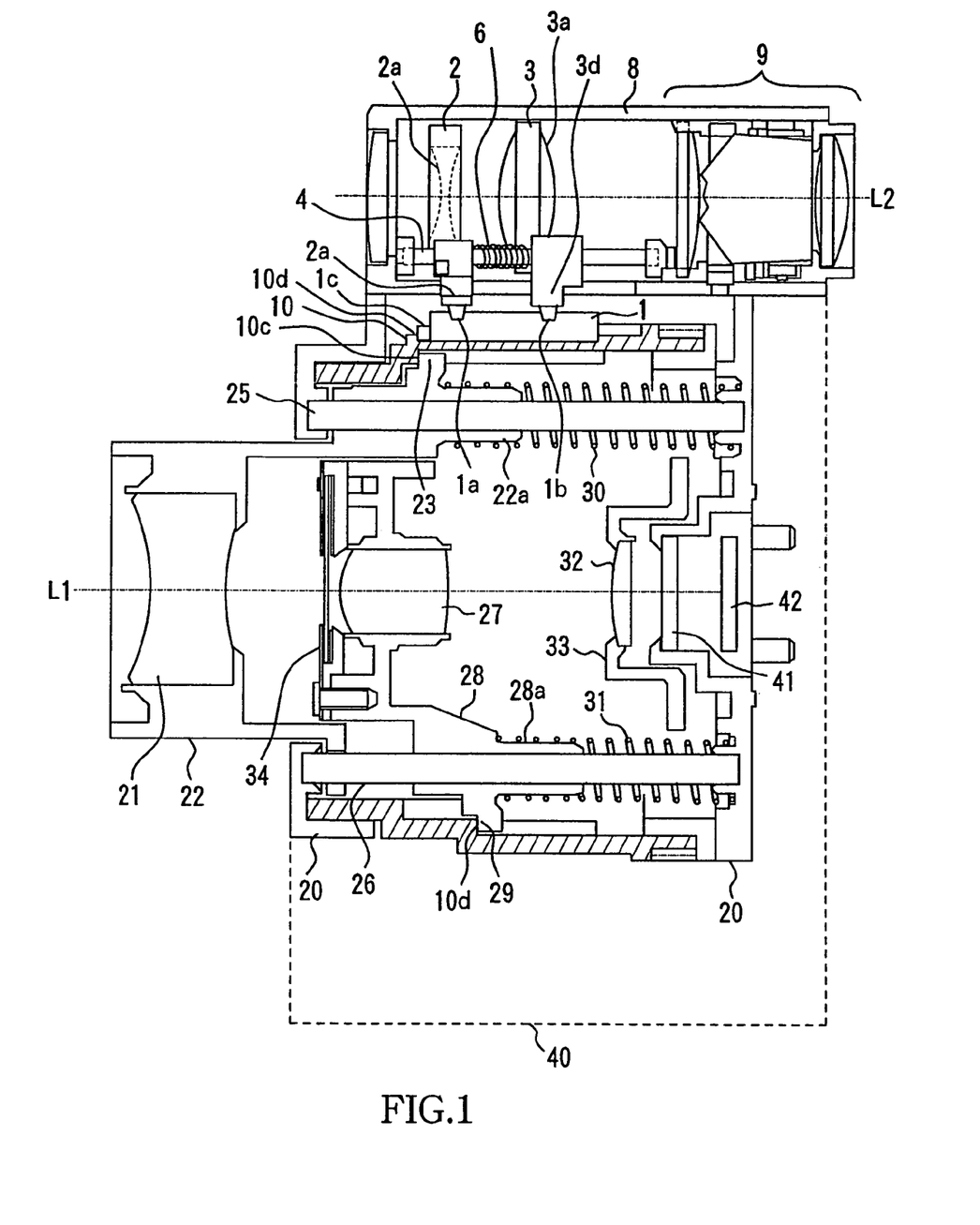
FIG. 1 is a sectional view of an image-taking apparatus that includes a viewfinder drive mechanism of Embodiment 1 of the present invention.

FIG. 1 is a sectional view of an image-taking apparatus that includes a viewfinder drive mechanism (lens drive mechanism) of Embodiment 1 of the present invention.

Figures 2A, 2B, 2C, 2D:
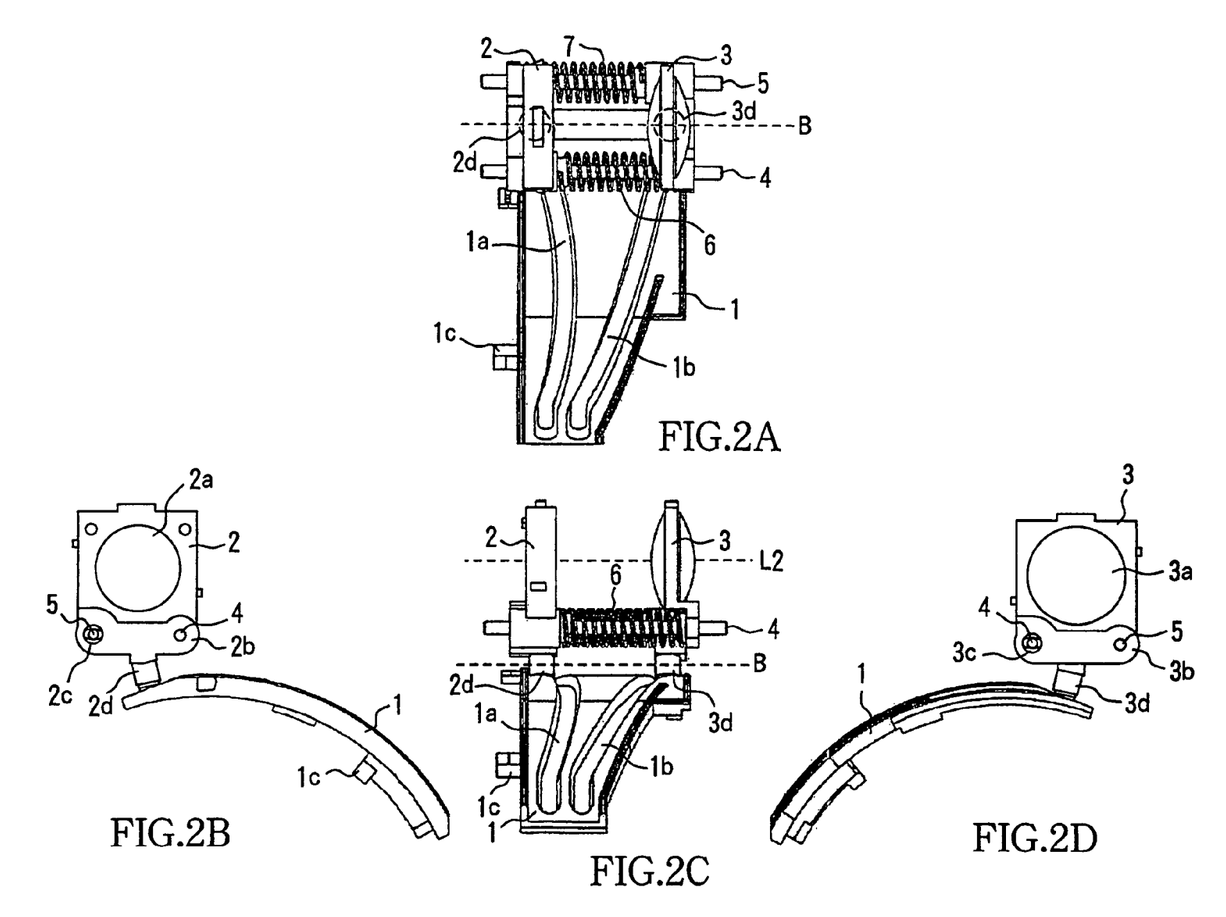
FIG. 2A is an upper view of the viewfinder drive mechanism in Embodiment 1.
FIG. 2B is a front view of the viewfinder drive mechanism.
FIG. 2C is a side view of the viewfinder drive mechanism.
FIG. 2D is a rear view of the viewfinder drive mechanism.

FIG. 2 shows the structure of the viewfinder drive mechanism in the image-taking apparatus of this embodiment. FIG. 2A is an upper view of the viewfinder drive mechanism, FIG. 2B is a front view of the viewfinder drive mechanism, FIG. 2C is a side view of the viewfinder drive mechanism, and FIG. 2D is a rear view of the viewfinder drive mechanism.

An image-taking optical system of this embodiment shall first be described with reference to the drawings.

In FIG. 1, Reference Numeral 10 denotes a drive ring, which drives the respective lens units that make up the image-taking optical system, and Reference Numeral 20 denotes a fixing member, which fixes the image-taking optical system to a main body 40 of the image-taking apparatus. Reference Numeral 21 denotes a first lens unit, which makes up a part of the image-taking optical system, Reference Numeral 22 denotes a first lens holding frame, which holds the first lens unit 21, and Reference Numeral 23 denotes a cam follower portion, provided on the first lens holding frame 22.

Reference Numeral 25 denotes a guide bar, which engages with a sleeve portion 22a of the first lens holding frame 22 and guides the first lens holding frame 22 in the direction of an optical axis (image-taking optical axis) L1.

Reference Numeral 27 denotes a second lens unit, which makes up a part of the image-taking optical system, Reference Numeral 28 denotes a second lens holding frame, which holds the second lens unit 27, and Reference Numeral 29 denotes a cam follower portion, provided on the second lens holding frame 28.

Reference Numeral 26 denotes a guide bar, which engages with a sleeve portion 28a of the second lens holding frame 28 and guides the second lens holding frame 28 in the optical axis L1 direction.

Furthermore, Reference Numerals 30 and 31 denote compression coil springs, which are respectively disposed on the outer peripheries of the guide bars 25 and 26 and between the respective lens holding frames 22 and 28 and the wall surface of the fixing member 20. The compression coil springs 30 and 31 energize the respective lens holding frames 22 and 28 towards the object side (left side in FIG. 1), and by this energizing force, the cam follower portions 23 and 29 that are disposed on the respective lens holding frames 22 and 28 are pressed without play against cam groove portions 10c and 10d, which are formed on the inner surface of the drive ring 10.

When the drive ring 10 rotates about the optical axis L1 of the image-taking optical system by receiving a driving force from an unillustrated actuator, since the cam follower portions 23 and 29 are in contact with the cam groove portions 10c and 10d, the cam follower portions 23 and 29 move along the cam track of the cam groove portions 10c and 10d. As a result, the lens holding frames 22 and 28, on which the cam follower portions 23 and 29 are formed, move in the optical axis L1 direction.

Also, by the contacting of a protruding portion 10d, formed on the outer circumferential surface of the drive ring 10, and a protruding portion 1c formed on a cam plate 1, the rotation force of the drive ring 10 is transmitted to the cam plate 1, and the cam plate 1 is thus also made to rotate about the optical axis L1 of the image-taking optical system.

Reference Numeral 32 denotes a third lens unit, which makes up a part of the image-taking optical system, and Reference Numeral 33 denotes a third lens holding frame which holds the third lens unit 32. The third lens holding frame 33 is driven in the optical axis L1 direction by receiving a driving force from an unillustrated actuator.

Reference Numeral 34 denotes a diaphragm unit, which is mounted to the second lens holding frame 28. The diaphragm unit 34 adjusts the amount of light that is made incident on an image surface and also functions as a shutter.

The first lens unit 21 functions as a compensator lens for correcting the variation of the focal point position due to movement of the second lens unit 27. The second lens unit 27 functions as a variator lens for varying the focal length of the image-taking optical system. The third lens unit 32 functions as a focusing lens for performing a focusing operation in the image-taking optical system.

Reference Numeral 42 denotes an image pickup element such as a CCD, CMOS sensor, that is fixed onto fixing member 20 and photoelectrically converts an object image (optical image), formed by the image taking optical system, to electrical signals. The image data that are read out from the image pickup element 42 are subject to a predetermined image processing and then recorded onto a recording medium (not shown) or are displayed on a display unit (not shown), provided in the main body 40. Reference Numeral 41 denotes an optical filter, positioned at the object side of the image pickup element 42, and functions as an optical low-pass filter and an infrared cut filter.

The structure of the viewfinder drive mechanism of this embodiment shall now be described in detail with reference to FIG. 1 and FIG. 2. As shown in FIG. 1, the viewfinder mechanism of this embodiment is used upon being mounted onto or built into the image-taking apparatus.

Reference Numeral 1 denotes the cam plate (cam member) that drives the respective lens units in the viewfinder optical system. The cam plate 1 has formed thereon the protruding portion 1c, which contacts the protruding portion of the drive ring 10, and rotates about the optical axis L1 of the image-taking optical system in conjunction with the driving ring 10.

Reference Numeral 2 denotes a first lens holding member, which holds a first viewfinder lens 2a that makes up a part of the viewfinder optical system, and Reference Numeral 3 denotes a second lens holding member, which holds a second viewfinder lens 3a that makes up a part of the viewfinder optical system.

Reference Numerals 4 and 5 denote guide bars (guide members), which guide the lens holding members 2 and 3, respectively, in the direction of an optical axis L2, and Reference Numerals 6 and 7 denote compression springs, which respectively energize lens holding members 2 and 3 in mutually separating directions (towards the object side and towards the image surface side) along the optical axis L2 and are disposed on the guide bars 4 and 5, respectively.

By the compression springs 6 and 7, a cam follower 2d of the first lens holding member 2 is put in contact with a side wall at the object side of a cam groove portion 1a and a cam follower 3d of the second lens holding member 3 is put in contact with a side wall at the image surface side of a cam groove portion 1b.

Reference Numeral 8 denotes a viewfinder lens barrel member, which houses the viewfinder mechanism, and Reference Numeral 9 denotes a viewfinder ocular optical system including a prism and lenses.

On the cam plate 1, the first cam groove portion 1a, which contacts the cam follower 2d of the first lens holding member 2, and the first cam groove portion 1b, which contacts the cam follower 3d of the second lens holding member 3 are formed.

A lens element 2a for image forming is mounted to the first lens holding member 2. A sleeve portion 2b is a portion that engages with the guide bar 4 and is for guiding the first lens holding member 2 in the optical axis L2 direction. A slot portion (rotation block portion) 2c is a portion that engages with the guide bar 5 to prevent the rotation of the first lens holding member 2 about the axis of the guide bar 4. The cam follower 2d is a portion that contacts the cam groove portion 1a formed on the cam plate 1. The cam follower 2d is disposed between the guide bars 4 and 5. In this embodiment, the cam follower 2d is disposed between the sleeve portions 2b and 3b in the optical axis direction. The sleeve portion 2b, slot portion 2c and cam follower 2d are disposed integrally on a portion of the first lens holding member 2 that opposes the cam plate 1.

A sleeve portion 3b is a portion that engages with the guide bar 5 and is for guiding the second lens holding member 3 in the optical axis L2 direction. A slot portion 3c is a portion that engages with the guide bar 4 to prevent the rotation of the second lens holding member 3 about the axis of the guide bar 5. The cam follower 3d is a portion that contacts the cam groove portion 1b formed on the cam plate 1. The cam follower 3d is disposed between the guide bars 4 and 5. In this embodiment, the cam follower 3d is disposed between the sleeve portions 2b and 3b in the optical axis direction. The sleeve portion 3b, slot portion 3c and cam follower 3d are disposed integrally on a portion of the second lens holding member 3 that opposes the cam plate 1.

The guide bar 4 is engaged with the sleeve portion 2b of the first lens holding member 2 and the slot portion 3c of the second lens holding member 3. The guide bar 5 is engaged with the sleeve portion 3b of the second lens holding member 3 and the slot portion 2c of the first lens holding member 2.

Furthermore, by the energizing forces of the compression springs 6 and 7, the cam followers 2d and 3d of the lens holding member 2 and 3 are put in contact with the cam groove portions 1a and 1b without play.

When the drive ring 10 rotates about the optical axis L1 of the image-taking optical system by receiving the driving force from the unillustrated actuator, the cam plate 1 rotates about the optical axis L1 of the image-taking optical system in conjunction with the drive ring 10. The cam followers 2d and 3d are in contact with the cam groove portions 1a and 1b of the cam plate 1 and are thus moved along the cam track of the cam groove portions 1a and 1b by the rotation of the cam plate 1. The lens holding members 2 and 3 are thereby moved in the optical axis L2 direction.

As described above, since the sleeve portion of one of the lens holding members 2 and 3 and the slot portion of the other lens holding member are engaged with each of the guide bars 4 and 5, the sleeve portions of the respective lens holding members can be disposed in a space-efficient manner, thereby enabling the making of the viewfinder mechanism compact. Here, if the sleeve portions 2b and 3b of the lens holding members 2 and 3 are engaged with a single guide bar, the operation spaces (spaces in the optical axis L2 direction) of the lens holding members 2 and 3 must be made large to avoid interference of the sleeve portions 2b and 3b. On the other hand, by providing the arrangement of this embodiment, the operation spaces of the lens holding members 2 and 3 can be made compact while avoiding the interference of the sleeve portions 2b and 3b.

Also, since the length (length in the optical axis direction) of the sleeve portions 2b and 3b can be secured, a play between the guide bars 4 and 5 and the sleeve portions 2b and 3b are reduced and the lens holding members 2 and 3 can thus be driven in the optical axis L2 direction with stability.

Furthermore, even if the cam followers 2d and 3d are positioned away from the sleeve portions 2b and 3b, since the play between the sleeve portions 2b and 3b and the guide bars 4 and 5 is reduced in comparison to the conventional lens drive mechanism as described above, a lens drive mechanism, which, though being compact, can guide the lens holding members 2 and 3 in the optical axis L2 direction with stability, can be realized.

The cam followers 2d and 3d are positioned, as shown in FIG. 2A, between the two guide bars 4 and 5, in particular with this embodiment, at substantially middle positions between the two guide bars 4 and 5. That is, the cam followers 2d and 3d are disposed at portions of the respective lens holding members 2 and 3 that oppose the cam plate 1 and are positioned at substantially the center of the interval between the guide bars 4 and 5. Priorly, the cam follower is positioned near the sleeve portion in order to guide the lens unit in the viewfinder optical system in the optical axis L2 direction with stability. Such an arrangement is used in the abovementioned Patent Document 1 and Patent Document 2. However, with this embodiment, the two cam followers 2d and 3d are disposed at positions that are substantially in the middle of the two guide bars 4 and 5 and are on a single axis (the axis B in FIG. 2), which extends parallel to the optical axis L2 of the viewfinder optical system.

The rotational phase positions of the cam groove portions 1a and 1b of the cam plate 1 with respect to the optical axis L1 of the image-taking optical system can thereby be matched substantially. Consequently, the length in the arc direction (outer circumferential direction of the drive ring 10) of the cam plate 1 can be restrained and it becomes possible to make the cam plate 1 compact. It thus becomes possible to make the image-taking apparatus compact.

Also, since the cam followers 2d and 3d are disposed at substantially middle positions between the two guide bars 4 and 5, the loads on the cam followers 2d and 3d by the energizing forces of the compression springs 6 and 7 are balanced uniformly, thereby enabling stable guiding of the lens holding members 2 and 3 in the optical axis direction.

Though in this embodiment, compression springs 6 and 7 are used, extension springs may be used instead. In the case where extension springs are used, energizing forces in mutually approaching directions along the optical axis L2 direction act on the lens holding members 2 and 3. Also, a compression spring may be disposed on the outer circumference of one of the guide bars 4 and 5 and an extension spring may be disposed on the outer circumference of the other guide bar.

Also, with this embodiment, the cam followers 2d and 3d are disposed at substantially middle positions between the two guide bars 4 and 5 and are disposed so as to fit within the thickness (length in the optical axis L2 direction) of the lens holding members 2 and 3, including the viewfinder lenses 2a and 3a. Here, the positions of the cam followers 2d and 3d may be shifted in accordance with the sensitivities of the viewfinder lenses (movable lenses) 2a and 3a.

For example, if the sensitivity, as optical performance, of the viewfinder lens 2a is higher than that of the viewfinder lens 3a, the cam follower 3d may be disposed at a position close to the first lens holding member 2.

Oppositely, if the sensitivity, as optical performance, of the viewfinder lens 3a is higher than that of the viewfinder lens 2a, the cam follower 2d may be disposed at a position close to the second lens holding member 3.

As has been described above, with this embodiment, since each of the two guide bars 4 and 5 is engaged with the sleeve portion (2b or 3b) of one of the lens holding members 2 and 3 and the slot portion (2c or 3c) of the other lens holding member, the sleeve portions 2b and 3b can be provided in a space-efficient manner on the lens holding members 2 and 3, thereby enabling the viewfinder drive mechanism to be made compact.

Also, since the lengths of sleeve portions 2b and 3b can be secured, the play between the guide bars 4 and 5 and the sleeve portions 2b and 3b is reduced and the lens holding members 2 and 3 can be driven with stability in the optical axis L2 direction.

And by disposing the two cam followers 2d and 3d along substantially the same axis B in the direction parallel to the optical axis L2 of the viewfinder optical system, the rotational phase positions of the cam groove portions 1a and 1b of the cam plate 1 with respect to the optical axis L1 of the image-taking optical system can be matched substantially. Consequently, the length in the arc direction of the cam plate 1 can be held down and it becomes possible to make the cam plate 1 compact. The image-taking apparatus can thus be made compact.

Embodiment 2

Embodiment 2 of the present invention shall now be described using FIG. 3. In FIG. 3, the same symbols are used for members that are the same as the members described in Embodiment 1.

Embodiment 2 differs from Embodiment 1 in that a guide bar 13, which guides lens holding members 50 and 60 (corresponding to the lens holding members 2 and 3 in Embodiment 1), holding viewfinder lenses 50a and 60a (corresponding to viewfinder lenses 2a and 3a in Embodiment 1), in the optical axis L2 direction, is provided in the viewfinder drive mechanism and prevents the rotations of the lens holding members 50 and 60.

The lens holding members 50 and 60 are engaged with the guide bars 4 and 5 as in Embodiment 1, and the lens holding members 50 and 60 are movable in the optical axis L2 direction along the guide bars 4 and 5. Also, cam followers 50d and 60d (corresponding to the cam followers 2d and 3d in Embodiment 1) are formed on the lens holding members 50 and 60 and put in contact with the cam groove portions 1a and 1b of the cam plate 1, respectively.

Figures 3A, 3B, 3C:
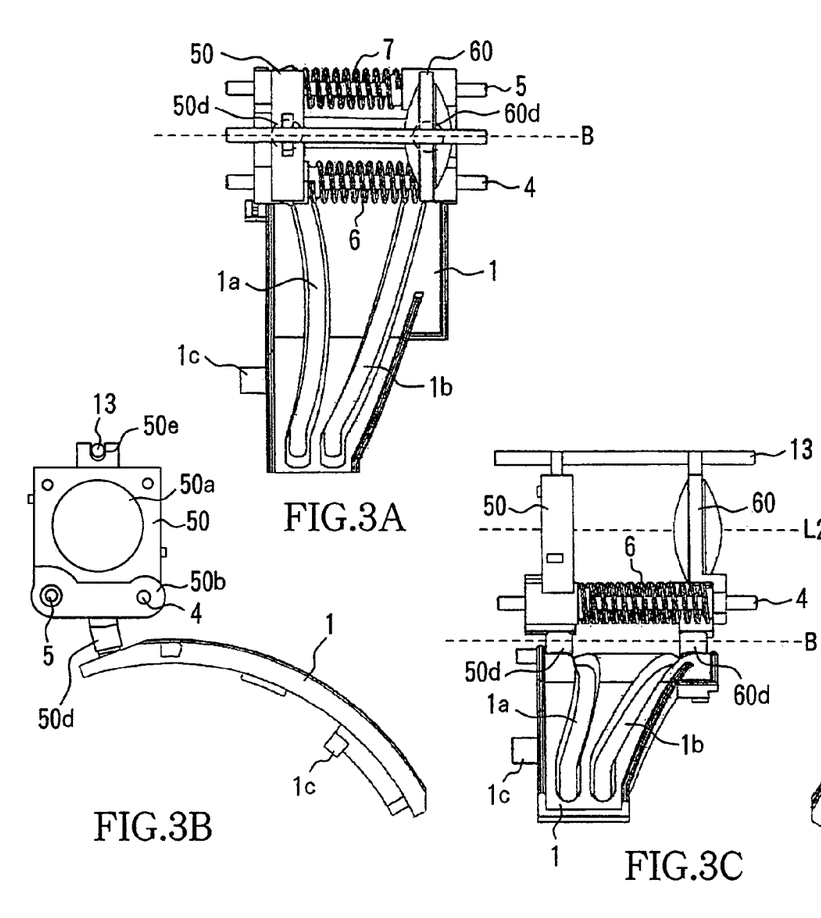
FIG. 3A is an upper view of a viewfinder drive mechanism in Embodiment 2 of the present invention.
FIG. 3B is a front view of the viewfinder drive mechanism.
FIG. 3C is a side view of the viewfinder drive mechanism.
Figure 3D:
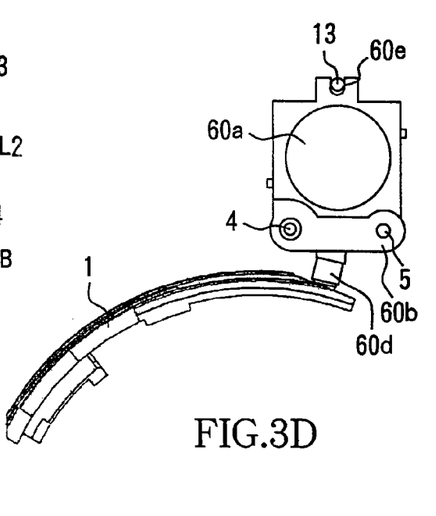
FIG. 3D is a rear view of the viewfinder drive mechanism.

As shown in FIG. 3B and FIG. 3D, slot portions 50e and 60e are provided at respective upper portions of the first lens holding member 50 and the second lens holding member 60, that is, at respective side portions opposite the side portions of the lens holding members 50 and 60, on which the cam followers 50d and 60d are formed.

And by the engagement of guide bar 13 with slot portions 50e and 60e, the lens holding members 50 and 60 are prevented from rotating.

By this arrangement, the rotations of the respective lens holding members 50 and 60 can be prevented at positions away from sleeve portions 50b and 60b (corresponding to the sleeve portions 2b and 3b in Embodiment 1), which engage with the guide bar 4, and even if the play becomes large due to manufacturing errors of the sleeve portions 50b and 60b, etc., deviations of the viewfinder lenses 50a and 60a with respect to the optical axis L2 can be restrained.

As described above, with Embodiment 2 of the present invention, by engaging the guide bar 13 with the slot portions 50e and 60e and thereby preventing the rotations of the lens holding members 50 and 60, the rotations of the respective lens holding members 50 and 60 can be prevented at positions away from the sleeve portions 50b and 60b, and even if the play becomes large due to manufacturing errors of the sleeve portions 50b and 60b, etc., optical axis deviations of the viewfinder lenses 50a and 60a can be restrained.

Though with Embodiments 1 and 2 described above, cam groove portions 1a and 1b are formed on the cam plate 1, these do not have to be groove portions and may instead be cams having protruding shapes.

While preferred embodiments have been described, it is to be understood that modification and variation of the present invention may be made without departing from the scope of the following claims. "This application claims priority from Japanese Patent Application No. 2003-307381 filed Aug. 29, 2003, which is hereby incorporated by reference herein."

What is claimed is:

1. A lens drive mechanism comprising:
   a first and a second guide member, each extending in a predetermined direction;
   a first lens holding member which includes a first holding portion holding a first lens, a first cam follower portion, a first sleeve portion and a first engaging portion, the first sleeve portion engaging with the first guide member and being guided along the first guide member, the first engaging portion engaging with the second guide member;
   a second lens holding member which includes a second holding portion holding a second lens, a second cam follower portion, a second sleeve portion and a second engaging portion, the second sleeve portion engaging with the second guide member and being guided along the second guide member, the second engaging portion engaging with the first guide member; and
   a cam member engaging with the first and second cam follower portions and driving the first and second lens holding members,
   wherein the first sleeve portion projects from an end face of the first holding portion toward the second lens holding member, and the second sleeve portion projects from an end face of the second holding portion toward the first lens holding member; and
   wherein the end faces of the first and second holding portions face each other.

2. The lens drive mechanism according to claim 1, wherein the first and second cam follower portions are positioned between the first and second guide members.

3. The lens drive mechanism according to claim 1, wherein the first and second cam follower portions are positioned substantially on an axis extending in the predetermined direction.

4. The lens drive mechanism according to claim 1, wherein each of the first and second cam follower portions is positioned within a region in the each lens holding member, which opposes the cam member and is between the first and second guide members.

5. An image-taking apparatus comprising:
   the lens drive mechanism according to claim 1;
   an image-taking lens unit;
   an image pickup element performing photoelectric conversion of an optical image formed by the image taking lens unit; and
   a drive member driving the image-taking lens unit and the cam member in the lens drive mechanism.

* * * * *